April 5, 1966   L. HOFFMANN ETAL   3,243,984
EXTRUSION PRESS FOR HOLLOW EXTRUSIONS
Filed Sept. 30, 1963   2 Sheets-Sheet 1

INVENTORS
LEO HOFFMAN
GUENTER W. SIBLER
BY Arthur H. Seidel

ATTORNEY

United States Patent Office 3,243,984
Patented Apr. 5, 1966

3,243,984
EXTRUSION PRESS FOR HOLLOW EXTRUSIONS
Leo Hoffmann, Chester, and Guenter W. Sibler, Media,
Pa., assignors to Baldwin-Lima-Hamilton Corporation,
Philadelphia, Pa., a corporation of Pennsylvania
Filed Sept. 20, 1963, Ser. No. 310,202
5 Claims. (Cl. 72—255)

In general, this invention relates to a new and improved extrusion press for the extrusion of tubes and other hollow elongated bodies and more particularly to an extrusion press for manufacturing closed end extrusions in a simple and easy manner.

In the past, in the extrusion of hollow tubes, it was necessary to have a separate cutoff procedure and/or cycle which consisted of shearing or sawing the extrusion after the mandrel had been withdrawn. This of course increased the time required for extruding.

Further, it was not possible with prior art apparatus, to manufacture a tube having one or both of its ends closed.

Further, it was not possible in prior art apparatus to control the quantity of initial solid extrusion as well as the amount of back extrusion through the dummy block clearance.

Therefore, it is the general object of this invention, to avoid and overcome the foregoing and other difficulties of prior art practices by the provision of a new and improved extrusion press.

Another object of this invention is the provision of a new and improved extrusion press which eliminates the need for a separate cutoff cycle.

Still another object of this invention is the provision of a new and improved extrusion apparatus capable of extruding hollow elongated bodies with a closed end at the beginning of the extrusion.

A still further object of this invention is the provision of a new and improved extrusion press which is capable of controlling the quantity of initial solid extrusion as well as the amount of back extrusion through the dummy block clearance.

Other objects will appear hereinafter.

For the purposes of illustrating the invention, there is shown in the drawings a form which is presently preferred; it being understood, however, that this invention is not limited to the precise arrangements and instrumentalities shown.

Figure 1:
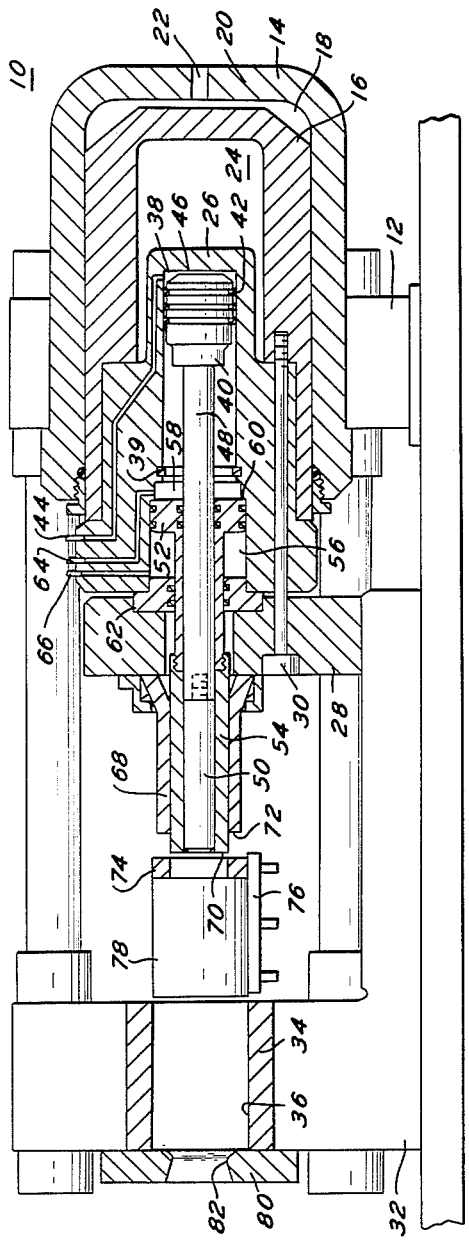
FIGURE 1 is a cross sectional view of an extrusion press built in accordance with the principles of the present invention in the initial extrusion position.

In FIGURE 1, there is shown the extrusion apparatus of the present invention generally designated by the numeral 10. The extrusion apparatus 10 includes a frame 12 to which is rigidly secured the extrusion ram cylinder casing 14. The casing 14 has the main ram cylinder casing 16 horizontally reciprocally mounted within the extrusion ram cylinder 18. At the closed end 20 of the extrusion ram cylinder 18 is the hydraulic inlet conduit 22 for receiving hydraulic fluid to power the main ram cylinder casing 16.

The main ram cylinder casing 16 has a main ram recess 24 axially aligned with the extrusion ram cylinder 18 and within which is rigidly supported a mandrel cylinder casing 26. The main ram cylinder casing 16, the mandrel cylinder casing 26, and a main ram guide support 28 are integrally connected through a series of bolts 30 only one of which is shown.

The main ram guide support 28 is horizontally reciprocally mounted on the container support 32 which forms a portion of the frame 12. The container support 32 supports a suitable container 34 having a cylindrical liner 36 which is axially aligned with the center line of the extrusion ram cylinder 18 and main ram recess 24.

The mandrel cylinder casing 26 has a mandrel cylinder 38 formed therein within which is slidably and horizontally reciprocally mounted the mandrel piston 40. The mandrel piston 40 has suitable piston rings 42 for achieving a fluid seal between the surface of the piston 40 and the surface of the mandrel cylinder 38. A mandrel piston hydraulic conduit 44 is provided through the mandrel cylinder casing 26 for delivering hydraulic fluid between the mandrel piston 40 and a back wall 46 of the mandrel cylinder 38.

The mandrel piston 40 is axially aligned with the extrusion ram cylinder 18 and the container 36 and has integral therewith a mandrel holder 48 connecting the piston 40 to a mandrel 50. The mandrel cylinder 38 has a snap ring 39 at the forward end thereof to limit forward travel of mandrel piston 40.

The mandrel 50 and mandrel holder 48 are slidably disposed within annular shear plunger 52 and its integral shear sleeve 54. The shear sleeve 54 and shear plunger 52 have an inner diameter equal to the outer diameter of the mandrel holder 48 and mandrel 50.

The annular shear plunger 52 is horizontally reciprocal within a shear plunger cylinder recess 56 formed within the mandrel cylinder casing 26 and concentric with the mandrel cylinder 38. The shear plunger cylinder recess 56 has a diameter greater than the diameter of the mandrel cylinder 38. Between the mandrel cylinder 38 and the shear plunger cylinder recess 56 there is a limit of travel recess 58 axially aligned with the shear plunger cylinder recess 56 and mandrel cylinder 38. The limit of travel recess 58 has a diameter less than the diameter of shear plunger cylinder recess 56 and slightly greater than the mandrel cylinder 38. Thus, the limit of travel recess 58 forms a limit stop 60 for the movement of the annular shear plunger 52.

The forward movement of the shear plunger 52 and thus the limit of travel within the shear plunger cylinder recess 56 is determined by an annular stop 62 whose inner diameter is equal to the outer diameter of the shear plunger 52 and which is rigidly secured between the mandrel cylinder casing 26 and the main ram guide support 28.

A limit of travel hydraulic conduit 64 provides a passage through the mandrel cylinder casing 26 for injecting hydraulic fluid into the limit of travel recess 58. A shear plunger hydraulic conduit 66 provides a hydraulic passageway through the mandrel cylinder casing 26 to a point within shear plunger cylinder recess 56 adjacent the annular stop 62.

The shear sleeve 54 is concentric with and slidably disposed within a stem 68 rigidly secured to the main ram cylinder casing 16 through the main ram guide support 28. It should be noted that the shear sleeve 54 has its end wall 70 extending beyond the end wall 72 of the stem 68. The end wall 70 of the shear sleeve 54 extends a distance equal to the thickness of an annular dummy block 74 whose inner diameter is equal to the outer diameter of shear sleeve 54 and whose outer diameter is substantially equal to or less than the diameter of container liner 36. Dummy block 74 is loaded into position axially aligned with the shear sleeve 54 and stem 68 by a billet loader 76. The billet loader 76 also places a billet 78 which is to be extruded into position between the dummy block 74 and the container 34. The billet 78 has an outer diameter substantially equal to or less than the diameter of the container liner 36.

At the end of the container liner 36 opposite from the billet loader 76 there is provided a suitable die having a die opening 82 which is equal to the outer diameter of the tube to be extruded.

As described above, the apparatus shown in FIGURE 1 is ready for the extrusion of billet 78 into a tube having both of its ends closed. If desired, the tube could be extruded with only one end closed as described below. Further, if the mandrel 50 is made long enough to reach through the die 80, after piercing billet 78 the formed closed end 84 would be separated by the mandrel 50 and would fall off. Thus, it would be possible to extrude tubing having both ends open by the apparatus of the present invention.

The apparatus of the present invention operates in the following manner:

With the billet 78 and dummy block 74 in the position shown in FIGURE 1, hydraulic fluid is forced under pressure into hydraulic inlet conduit 22 thus moving main ram cylinder casing 16 forward within the extrusion ram cylinder 18. Billet 78 is pushed into the container 34 and dummy block 74 seats on shear sleeve 54 abutting end wall 72 of stem 68. Then billet loader 76 is swung out of position so as not to interfere with the extrusion process.

With the billet 78 abutting die 80, hydraulic fluid is introduced into mandrel piston cylinder conduit 44 and shear plunger hydraulic conduit 66. Limit of travel hydraulic conduit 64 is opened for returning hydraulic fluid to the reservoir. The introduction of hydraulic fluid into shear plunger hydraulic conduit 66 maintains shear plunger 52 against limit stop 60. The introduction of hydraulic fluid into mandrel piston hydraulic conduit 44 forces hydraulic between mandrel piston 40 and back wall 46 of mandrel cylinder 38. This latter action forces the mandrel piston 40 forward causing mandrel 50 to pierce billet 78. It should be noted that the mandrel 50 has a diameter less than the diameter of the die opening 82. After the mandrel 50 has completed its forward travel, the mandrel piston 40 will have abutted annular shear plunger 52.

The piercing of the billet 78 by the mandrel 50 extrudes the billet through the die opening 82 forming a closed end 84 for the extrusion. As stated previously if the closed end 84 is not desired, a mandrel would have to be longer to separate the closed end 84 from the billet 78. However, to obtain an extrusion which was hollow and closed at both ends, the apparatus as shown is preferred.

Figure 2:
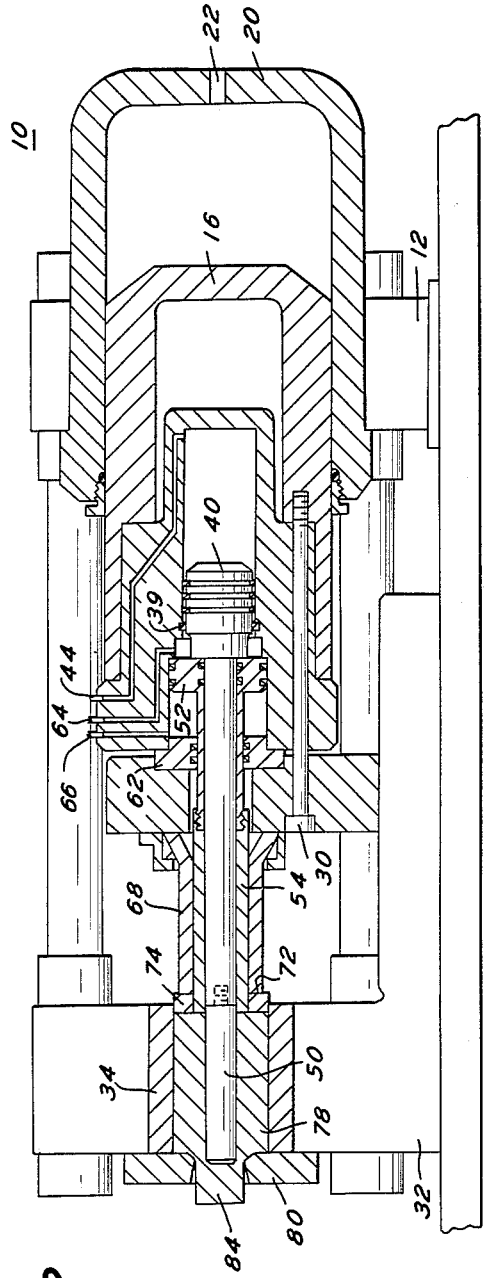
FIGURE 2 is a cross sectional view of the apparatus of FIGURE 1 after the first step of the extrusion process.

Once the piercing operation of FIGURE 2 is completed, the mandrel piston 40 is maintained in the fully forward position abutting shear plunger 52 and snap ring 39. Additional hydraulic fluid is then introduced through hydraulic inlet conduit 22 behind main ram cylinder casing 16 to force the stem 68, dummy block 74 and shear sleeve 54 forward with mandrel 50. Thus, the billet 78 will be extruded into a hollow tube 86 having a closed end 84. The hollow tube 86 will be formed around the mandrel 50 and between the mandrel 50 and the die 80.

Figure 3:
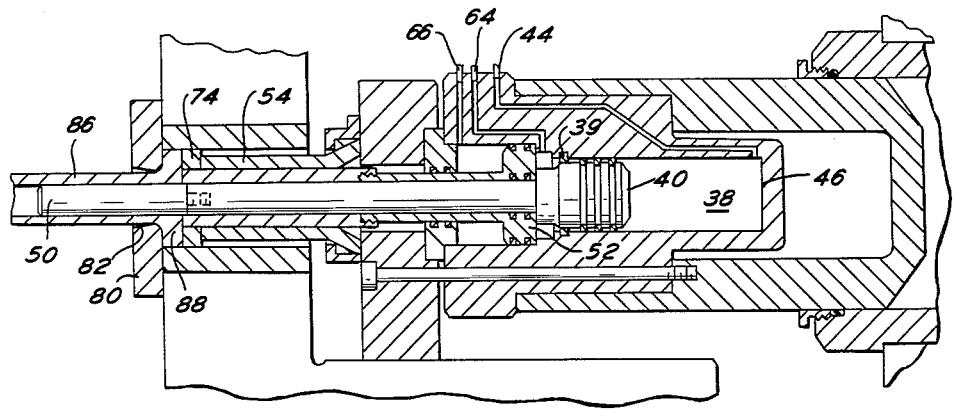
FIGURE 3 is a cross sectional view of the apparatus of FIGURES 1 and 2 after the third step in the extrusion process.

At the completion of this operation, as shown in FIGURE 3, the dummy block 74 and shear sleeve 54 have reached a point adjacent but not abutting the die 80 within the container liner 36. Thus, a butt 88 is formed from the remainder of the billet 78 within the container liner 36.

If it is then desired to form the extrusion with both ends closed, the valve supplying limit of travel hydraulic conduit 64 and mandrel piston hydraulic conduit 44 is reversed connecting mandrel piston hydraulic conduit 44 to the reservoir and limit of travel hydraulic conduit 64 to the source of hydraulic pressure. Since the shear plunger hydraulic conduit 66 is still connected to the source of hydraulic fluid, the shear plunger 52 will remain in position against the limit stop 60. However, mandrel piston 40 will be forced backward toward the back wall 46 of the mandrel cylinder 38 withdrawing mandrel 50 from within the hollow tube 86. The mandrel 50 will be withdrawn until the front end thereof is flush with shear cylinder 54 and dummy block 74.

Hydraulic fluid will then be additionally supplied through hydraulic inlet conduit 22 to force the entire main ram including main ram cylinder casing 16 and stem 68 forward extruding the butt 88 to form a closed end butt 90 for the hollow tube 86.

Figure 5:
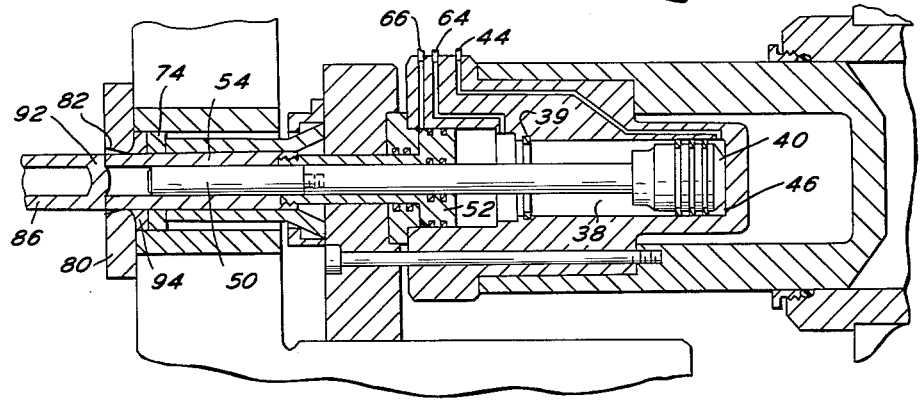
FIGURE 5 is a cross sectional view of the apparatus of FIGURES 1-4 after the fifth step of the extrusion process.

Once the closed end butt 90 is formed, the step shown in FIGURE 5 is initiated. That is, the valve supplying hydraulic fluid to shear plunger hydraulic conduit 66 is reversed connecting the shear plunger conduit 66 to a reservoir. Thus, the hydraulic fluid being supplied to limit of travel hydraulic conduit 64 will force shear plunger 52 forward causing shear sleeve 54 to shear the closed end butt 90 in cooperation with the die opening 82 thus forming an extrusion closed end 92 for the tube 86 with only a small annular waste 94 remaining in the container 34. The apparatus 10 can then be returned to its initial position by any means desired.

Figure 4:
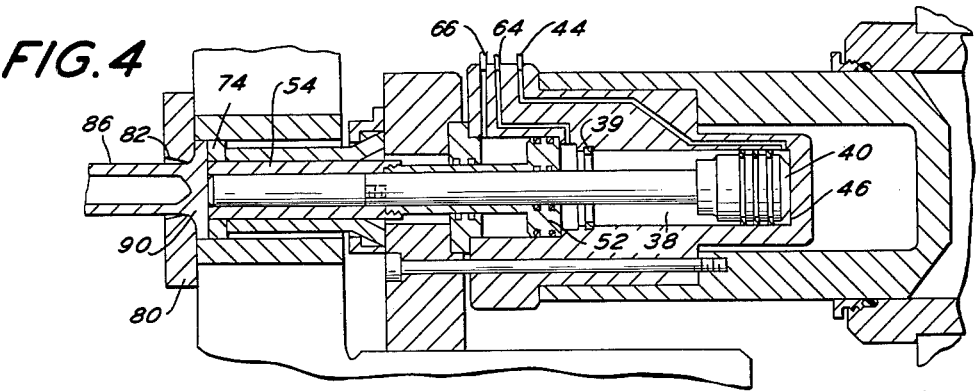
FIGURE 4 is a cross sectional view of the apparatus of FIGURES 1-3 after the fourth step in the extrusion process.

If the extrusion was to be manufactured without a closed end 92, step 4 shown in FIGURE 4 would be omitted and the operation would have proceeded from the FIGURE 3 step to the FIGURE 5 step by merely introducing hydraulic fluid into limit of travel recess 58 through limit of travel hydraulic conduit 64 while maintaining pressure through mandrel piston hydraulic conduit 44 and connecting shear plunger hydraulic conduit 66 to the reservoir. This would have forced the shear sleeve 54 into the forward position shown in FIGURE 5 while the mandrel 50 remained within the hollow tube 86.

Thus, it has been possible to eliminate a separate cut-off cycle consisting of a shearing or sawing action after the mandrel had been withdrawn from the extrusion in accordance with the objects of the present invention. Further, the extrusion apparatus of the present invention is extremely versatile in that it is able to extrude billets into tubes having one, none, or both ends closed.

When the extrusion mandrel of the present invention is used for piercing solid billets, as described, it is the practice after loading of the billet to advance the stem 68 tightly against the billet 78 and dummy block 74 in order to press the heat-plastic metal of the billet into overall solid contact with the liner 36 of container 34 so that the billet cannot deflect in any way when the advancing mandrel 50 pierces the billet as shown in FIGURE 2.

It is thus possible to pierce the billet by advancing the internal mandrel 50 while holding the pressing stem 68 yieldingly against the dummy block 74 as described above. In this manner, the quantity of initial solid extrusion as well as any tendency of back extrusion through the dummy block clearance can be perfectly controlled by the amount of yield permitted in the stem 68. The yield of the stem 68 is of course determined by the control of hydraulic fluid through hydraulic inlet conduit 22 behind the main ram cylinder casing 16.

Further, by utilizing the annular shear plunger 52 in cooperation with the stepped cylinder recesses in the mandrel cylinder casing 26 and the annular stop 62, the stroke of the shear sleeve 54 can be accurately controlled.

The present invention may be embodied in other specific forms without departing from the spirit or essential attributes thereof and, accordingly, reference should be made to the appended claims, rather than to the foregoing specification as indicating the scope of the invention.

We claim:

1. Extrusion apparatus comprising a main ram, a stationary die having an opening therein, said main ram being axially aligned with said die opening and reciprocally mounted for movement in a forward direction toward said die opening and in a backward direction away from said die opening, a billet container axially aligned with and between said die and main ram, said main ram having an annular stem on the end thereof facing said die, said container having a passage therethrough, said stem being slidably receivable within said container passage, an annular shear sleeve axially aligned with and positioned within said stem for reciprocal movement with respect to said stem, a mandrel axially aligned with and positioned within said shear sleeve for reciprocal movement with respect to said shear sleeve, main ram power means for axially moving said main ram in a forward and backward direction, shear sleeve power means for axially moving said shear sleeve with respect to said main ram and said mandrel, and mandrel power means for axially moving said mandrel with respect to said shear sleeve and main ram.

2. The extrusion apparatus of claim 1 wherein said shear sleeve has an outer contour slightly smaller than the contour of said die opening.

3. The extrusion apparatus of claim 2 including an annular dummy block, said dummy block having an inner diameter equal to the outer diameter of the shear sleeve, said dummy block having an outer diameter equal to the diameter of said container passage, said shear sleeve having a forwardmost and backwardmost position, said shear sleeve in said backwardmost position having its forward end spaced from the forward end of said stem a distance equal to the thickness of said dummy block, said mandrel having a forwardmost and backwardmost position, said mandrel backwardmost position placing the forward end of said mandrel flush with the forward end of said shear sleeve.

4. The extrusion apparatus of claim 1 wherein said main ram has a cylindrical recess therein, said mandrel being integrally connected to a mandrel piston, said piston being reciprocally mounted within a mandrel cylinder portion of said main ram recess, said shear sleeve power means including an annular shear plunger, said shear plunger being reciprocally mounted within a shear plunger recess within said main ram recess, said shear plunger recess having a greater diameter than said mandrel cylinder and being axially aligned therewith, whereby said main ram forms a limit stop for said annular shear plunger.

5. The extrusion apparatus of claim 4 wherein said shear sleeve power means includes a forward shear sleeve hydraulic conduit connected to the forward end of said shear plunger recess and a backward shear sleeve hydraulic conduit for supplying hydraulic fluid to the back portion of said shear plunger recess adjacent the forward end of said mandrel cylinder, said mandrel power means including a back hydraulic conduit extending to the back portion of said mandrel cylinder to feed hydraulic fluid behind said mandrel piston to force said mandrel piston forward, said backward shear sleeve hydraulic conduit also being operative to supply hydraulic fluid to the forward end of said mandrel cylinder to force said mandrel piston backward.

References Cited by the Examiner

UNITED STATES PATENTS

| | | | |
|---|---|---|---|
| 1,976,447 | 10/1934 | Keck | 207—3 |
| 2,713,941 | 7/1955 | Schuler | 207—3 |
| 2,822,087 | 2/1958 | Lorant | 207—3 |
| 2,896,783 | 7/1959 | Swanson | 207—3 |
| 3,002,615 | 10/1961 | Lemelson | 207—3 |

FOREIGN PATENTS 192,471   12/1907   Germany.

CHARLES W. LANHAM, *Primary Examiner.*